United States Patent [19]

Johnson

[11] 4,391,921
[45] Jul. 5, 1983

[54] ELASTOMERIC SILICONE SPONGE
[75] Inventor: Robert D. Johnson, Charlotte, N.C.
[73] Assignee: Dow Corning Corporation, Midland, Mich.
[21] Appl. No.: 391,898
[22] Filed: Jun. 25, 1982
[51] Int. Cl.³ .............................. C08J 9/28; C08J 9/30
[52] U.S. Cl. ........................................ 521/66; 521/65; 521/154
[58] Field of Search .................................. 521/66, 154
[56] References Cited
U.S. PATENT DOCUMENTS

| | | | |
|---|---|---|---|
| 2,432,353 | 12/1947 | Talalay | 260/723 |
| 2,758,980 | 8/1956 | Talalay et al. | 521/66 |
| 2,984,631 | 5/1961 | Talalay et al. | 521/66 |
| 3,031,427 | 4/1962 | Talalay et al. | 521/66 |
| 3,120,498 | 2/1964 | Matthaeus et al. | 521/66 |
| 3,130,171 | 4/1964 | Sutherland, Jr. | 521/66 |
| 3,228,905 | 1/1966 | Talalay et al. | 521/66 |
| 3,238,172 | 3/1966 | Talalay et al. | 521/66 |
| 3,673,133 | 6/1972 | Schmidt | 521/66 |

OTHER PUBLICATIONS

Carl, "Neoprene Latex", E. I. DuPont de Nemours and Co., 1962, pp. 89-92.
Carl, "Neoprene Latex", E. I. DuPont de Nemours and Co.(Inc.), 1962.

Primary Examiner—Morton Foelak
Attorney, Agent, or Firm—Roger H. Borrousch

[57] ABSTRACT

A method of producing silicone elastomeric sponge is disclosed. The method comprises freezing an aqueous silicone emulsion, then thawing and drying to produce a silicone sponge containing irregular closed cells. The aqueous silicone emulsion comprises water, an anionically stabilized hydroxyl endblocked polydiorganosiloxane, an organic tin compound, and a colloidal silica, the emulsion having a pH of from 9 to 11.5 inclusive.

The sponge produced by the method is useful as insulation and gasketing at high and low temperatures.

13 Claims, No Drawings

ELASTOMERIC SILICONE SPONGE

BACKGROUND OF THE INVENTION

1. Field of the Invention

This invention relates to a method of producing silicone elastomeric sponge from an aqueous emulsion of polydiorganosiloxane, colloidal silica, and an organic tin compound.

2. Description of the Prior Art

A method of foam production from elastomeric emulsions is known as the Talalay process. As described in U.S. Pat. No. 2,432,353, a natural rubber latex is compounded with curing agents, then caused to expand by mixing with hydrogen peroxide. While expanding, the mixture is poured into an aluminum mold. After the expanding mixture fills the mold, the contents of the mold are frozen by immersing the mold in a brine at −30° C. The mold is then connected to a vacuum and a supply of alkaline calcium chloride brine at −2° C. is drawn through the expanded, frozen mixture to cause an irreversible coagulation to take place. The mold is then transferred to a live steam vulcanizer where it is heated for 25 minutes at 125° C. to vulcanize the natural rubber. The vulcanized foam article is then removed from the mold, washed, centrifugally extracted and dried. Talalay teaches the preliminary formation of the foam can be effected by any of the known procedures, such as mechanical whipping, chemical gas generation, or physical release of gas or vapor.

In the book "Neoprene Latex", by J. C. Carl, published by E. I. Dupont DeNemours and Co. (Inc.) (1962), a process of converting specialized neoprene latex to foam is described. The latex fillers, curing agent, accelerator, and foam stabilizing surface active agents are mixed, then the mixture is stirred rapidly to whip in air and create a froth. The froth is stirred until it is refined to a smooth cream. A gelling agent is then added and the froth placed in a mold. The foam produced by the gelling of the froth is usually cured by exposured to steam. After curing, the foam is washed and dried.

The processes as discussed above require the gelling of the froth to stabilize the foam by the use of either an internal gelling agent as discussed for a neoprene latex or an external gelling agent as discussed with a natural rubber latex. This gelling step must be carefully controlled in order to produce satisfactory foam.

SUMMARY OF THE INVENTION

A silicone elastomeric sponge is produced by freezing, then thawing and drying a silicone emulsion. The silicone emulsion comprises water, an anionically stabilized hydroxyl endblocked polydiorganosiloxane, colloidal silica, and an organic tin compound, the emulsion having a pH in the range of 9 to 11.5 inclusive. The emulsion can also contain an organic amine, a thickener, and a filler other than colloidal silica.

The method of this invention is much simpler than previous methods of producing foam from emulsions. The process consists only of freezing the emulsion, then thawing and drying. There is no separate coagulation and vulcanization steps required as is necessary with previous methods of producing foam or sponge. The production of sponge by this method does not create any problems with toxic vapor or pollutants caused by gases or vapor given off by the process such as those found with many previous foam and sponge processes.

DESCRIPTION OF THE INVENTION

This invention relates to a method comprising (a) freezing a silicone emulsion which provides an elastomeric product upon removal of the water, having a pH in the range of 9 to 11.5 inclusive, comprising water, 100 parts by weight of an anionically stabilized hydroxyl endblocked polydiorganosiloxane having an average molecular weight of greater than 10,000, an organic tin compound, and at least one part by weight of colloidal silica, long enough to freeze the water and produce a solid frozen article; (b) thawing the solid frozen article yielding a wet elastomeric sponge-like article; and (c) drying the wet elastomeric sponge-like article until the water is removed and an elastomeric sponge is obtained.

The composition of the emulsion that is used in the method of this invention to produce silicone elastomeric sponge allows the emulsion to be transformed into a sponge by freezing the emulsion, then thawing and drying without any further additions of materials such as coagulating agents as are commonly used in producing foam by previous methods. The emulsion used in this invention can be frozen to produce a solid frozen article at which time it undergoes a change. When the solid frozen article is thawed it is no longer a liquid. The frozen article when thawed is a wet, elastomeric sponge-like article which is capable of maintaning its shape when removed from the container in which it is frozen. The freezing and thawing steps transform the originally liquid emulsion into a firm, jelly-like mass. Drying the wet elastomeric sponge-like article by exposing to ambient air or by heating then yields a cured elastomeric sponge. The cured elastomeric sponge is composed of primarily closed, irregularly shaped cells. The nature of the cells can be varied by varying the ratio of water to solids in the original emulsion, the thickness of the emulsion layer being frozen, and the rate of freezing. If the solids content of the emulsion is low, the wet article must be supported throughout the drying step as the sponge may not have enough strength to withstand the weight of the entrapped water. Higher solids content results in a sponge with a higher density.

The effect of the thickness of the emulsion layer being frozen on the final cured sponge is not clearly resolved. When thin films of emulsion, such as 1 mm, are frozen, the cured layer is not a sponge, but a solid elastomeric film. When layers of greater than 10 mm are frozen, the cured layer is a sponge. If a sponge of less than 10 mm thickness is desired, it is necessary to cut it from a thicker layer or one can mechanically mix air into the emulsion before it is frozen so that the emulsion is a froth as it is being frozen.

When it is desired to make a sponge of lower density than is readily obtained by simply freezing the liquid emulsion, the emulsion is mechanically stirred to mix air into the emulsion to produce a froth. This froth is then frozen, thawed, and dried to yield an elastomeric sponge of a lower density.

The simplest embodiment of the method of this invention is freezing the emulsion until solid, thawing at ambient air temperature, and then allowing the wet sponge to dry by exposure to ambient air temperature until the sponge dries. Since the sponge is primarily of closed cells, such a procedure takes several days if the sponge is of a thickness such as 20 mm. The process of drying can be accelerated by drying in an oven at elevated temperatures. The wet sponge should not be exposed to temperatures approaching 100° C. as the vapor pressure of rapidly evaporating water can rupture the wet sponge. After the wet sponge is partially dried so that the sponge has greater strength, the temperature can be raised to speed the drying process. The thawing step and drying step can be combined by heating the solid frozen article directly without a separate thawing step.

The emulsion, before being frozen, can also contain additional ingredients such as an organic amine, a thickener, filler other than colloidal silica, and the common additives for silicone elastomers such as heat stability additives, compression set additives, and pigments. Additives are selected to maintain the emulsion at a pH in the range of 9 to 11.5 inclusive. Additives should also be evaluated for their effect on the storage stability and ultimate physical properties of the sponge. Such additives can be added as an aqueous emulsion or in a finely divided dry form.

Fillers other than colloidal silica can be semi-reinforcing and extending fillers that are not acidic such as diatomaceous earth, finely ground quartz, alkaline clays, titanium dioxide, and non-acidic carbon black.

The emulsion used in the method of this invention comprises water, an anionically stabilized hydroxyl endblocked polydiorganosiloxane, an organic tin compound, and colloidal silica, the emulsion having a pH in a range of 9 to 11.5 inclusive. Such an emulsion is described in U.S. Pat. No. 4,221,688, issued Sept. 9, 1980, of Johnson, Saam, and Schmidt, said patent being hereby incorporated by reference to describe the emulsion and how to manufacture it.

The hydroxyl endblocked polydiorganosiloxanes are those which can be emulsified and which impart elastomeric properties to the product obtained after the removal of the water from the emulsion. Such hydroxyl endblocked polydiorganosiloxanes should have a weight average molecular weight ($\overline{M}w$) of at least 10,000. Hydroxyl endblocked polydiorganosiloxanes with a lower $\overline{M}w$ range, such as 5000 to 10,000, do not provide strong elastomeric products. Tensile strengths and elongations at break improve with increasing molecular weight, with reasonable tensile strengths and elongations obtained above 30,000 $\overline{M}w$ and the best tensile strengths and elongations obtained above 50,000 $\overline{M}w$. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical. The preferred $\overline{M}w$ for the hydroxylated polydiorganosiloxanes are in the range of 200,000 to 700,000. The viscosity of the polymer obtained upon removal of the water from the emulsion will vary from about 75 Pa.s at 25° C. to about 4,000 Pa.s at 25° C. with the preferred range from about 1,000 Pa.s at 25° C. to 3,000 Pa.s at 25° C.

The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl and phenyl and examples of 2-(perfluoroalkyl)ethyl radicals include 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom, that can include trace amounts of monoorganosiloxane or triorganosiloxane groups present as impurities of the manufacturing process. The preferred hydroxyl endblocked polydiorganosiloxanes are the hydroxyl endblocked polydimethylsiloxanes.

The most preferred hydroxyl endblocked polydiorganosiloxanes are those prepared by the method of anionic emulsion polymerization described by Findlay et al. in U.S. Pat. No. 3,294,725, issued Dec. 27, 1966, which is hereby incorporated by reference to show the methods of polymerization and to show the hydroxyl endblocked polydiorganosiloxane in emulsion. Another method of preparing hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes and their method of preparation. These methods and others are known in the art. The hydroxyl endblocked polydiorganosiloxanes used in the emulsion are those which are anionically stabilized. As used herein, "anionically stabilized" means the hydroxyl endblocked polydiorganosiloxane is stabilized in emulsion with an anionic surfactant.

Anionic surfactants are preferably the salt of the surface active sulfonic acids used in the emulsion polymerization to form the hydroxyl endblocked polydiorganosiloxane as shown in U.S. Pat. No. 3,294,725 cited above which is hereby incorporated by reference to show the surface active sulfonic acids and salts thereof. The alkali metal salts of the sulfonic acids are preferred, particularly the sodium salts. The sulfonic acid can be illustrated by aliphatically substituted benzenesulfonic acids, aliphatically substituted naphthalene sulfonic acids, aliphatic sulfonic acids, silylalkylsulfonic acids and aliphatically substituted diphenylethersulfonic acids.

One of the advantages of the emulsions described herein is the relatively small amount of surfactant or emulsifying agent needed to maintain a stable emulsion. The amount of anionic emulsifying agent can be less than 2 weight percent of the emulsion, wherein this amount can result from the neutralized sulfonic acid wherein the sulfonic acid is used in the emulsion polymerization method for the preparation of the hydroxyl endblocked polydiorganosiloxane. Other anionic emulsifying agents can be used, for example, alkali metal sulfonicinoleates, sulfonated glyceryl esters of fatty acids, salts of sulfonated monovalent alcohol esters, amides of amino sulfonic acids such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate, and sodium lauryl ether sulfate.

Although not specifically required, one can optionally include nonionic emulsifying agents in addition to the anionic emulsifying agents. Such nonionic emulsifying agents can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine.

Colloidal silica is a required ingredient of the emulsions. Any of the colloidal silicas can be used. These colloidal silicas are well known in the art and many are commercially available. Although any of the colloidal silicas can be used including fumed colloidal silicas and precipitated colloidal silicas, the preferred colloidal silicas are those which are available in an aqueous medium. Colloidal silicas in an aqueous medium are usually available in a stabilized form, such as those stabilized with sodium ion, ammonia, or an aluminum ion. Aqueous colloidal silicas which have been stabilized with sodium ion are preferred because the pH requirement can be met by using such a sodium ion stabilized colloidal silica without having to add additional ingredients to bring the pH within the range of 9 to 11.5. The term "colloidal silica" as used herein are those silicas which have particle diameters of from 0.0001 to 0.1 micrometer. Preferably, the particle diameters of the colloidal silicas are from 0.001 to 0.05 micrometer. The relative amounts of hydroxyl endblocked polydiorganosiloxane and colloidal silica can vary over a wide range, such as from 1 part to 150 parts by weight of colloidal silica for each 100 parts by weight of hydroxyl endblocked polydiorganosiloxane. Amounts of colloidal silica from 10 to 50 parts by weight for each 100 parts by weight of hydroxyl endblocked polydiorganosiloxane are preferred in the method of the instant invention.

The silicone emulsion has a continuous water phase in which there is a dispersed phase which comprises an anionically stabilized hydroxylated polydiorganosiloxane and colloidal silica. For this silicone emulsion to maintain a storage stability and also be curable to an elastomer after the emulsion is stored, the pH of the silicone emulsion must be within the range of 9 to 11.5 inclusive. The silicone emulsions which have the best storage stability and still have the ability to form elastomers at ambient conditions at any point during the storage stable period are those which have a pH in the range of 10.5 to 11.2.

A silicone emulsion of hydroxyl endblocked polydiorganosiloxane and colloidal silica does not provide a useful elastomeric product when the water is allowed to evaporate at ambient conditions immediately after the emulsion is prepared. An aging period is necessary before an elastomer can be formed from the emulsion, but such an aging period can take a long time, such as up to five months. The addition of an organic tin compound, preferably a dialkyltindicarboxylate, can be used to reduce the aging period to one to three days. After the aging period, an elastomeric product can be obtained by the removal of the water under ambient conditions. Dialkyltindicarboxylate can be used in amounts of from 0.1 to 2 parts by weight for each 100 parts by weight of the hydroxyl endblocked polydiorganosiloxane, preferably about 0.25 to 1.5 parts by weight are used. Dialkyltindicarboxylates include dibutyltindiacetate, dibutyltindilaurate, and dioctyltindilaurate. The preferred dialkyltindicarboxylate is dioctyltindilaurate.

The long-term storge stability of the emulsion has been found to be improved by the addition of an organic amine. The organic amine can be primary, secondary, or tertiary amines which contain carbon, hydrogen, and nitrogen, and can also contain oxygen, and which are water soluble in the amounts required. These organic amines include diethylamine, ethylenediamine, butylamine, hexylamine, morpholine, monoethanolamine, triethylamine, and triethanolamine. The preferred amine is diethylamine. The organic amines can be added neat or in aqueous emulsion provided that they do not cause the anionically stabilized hydroxyl endblocked polydiorganosiloxane emulsion to break during their addition. For this reason, it is preferable to add the amine as an aqueous solution.

A thickening agent can be used to adjust the viscosity of the emulsion. Suitable thickeners are available commercially and would be selected for their stability and usability in thickening the emulsion at a pH in the range of 9 to 11.5 inclusive. Some of the useful thickeners include the classes of cellulose derivatives, alkali salts of polyacrylates and polymethacrylates, sodium and ammonium salts of carboxylate copolymers, and colloidal clays.

The ingredients used in preparing the emulsion used in the method of this invention can be mixed together by any suitable means. In a simple batch operation, for instance, the anionically stabilized hydroxyl endblocked polydiorganosiloxane emulsion is placed in a mixing container, the colloidal silica in the form of a colloidal dispersion is added with mixing, the organic tin compound is also added in the form of an emulsion, sufficient amine is added to adjust the pH to the required range, and the mixture is stirred until uniform. A thickening agent or other incidental additives can also be stirred in.

To obtain the preferred pH range of 10.5 to 11.2, it will usually require adjusting the pH after the siloxane polymer, colloidal silica, organic tin compound, and any additional ingredients have been mixed. The pH is adjusted with the amine compound or with an alkali metal hydroxide or a combination thereof. The preferred alkali metal hydroxide is sodium hydroxide. For the purposes of this invention, the term "pH" means the electrical potential measured on commercially available glass electrodes designed for this purpose when the glass electrode is immersed in the emulsion. The electrode is calibrated with a standard buffer solution which gives a pH of 10.

The method of this invention is useful for producing silicone elastomeric sponge. The emulsion used in this method uses inexpensive raw materials, requires simple processing, is a one-part system, and has a long shelf life. The method of this invention requires simple processing, using equipment that is readily available. The sponge produced has primarily irregular shaped closed cells throughout the cured article. The cured sponge is useful for thermal insulation and gasketing, particularly where the sponge is subjected to extremely high or low temperatures which are within the known operating limits of silicone elastomers. The sponge, because of its closed cells and resiliency at both high and low temperatures, is particularly suitable as a gasket for sealing irregular surfaces as it easily conforms to the surface under low pressure.

The following examples are included for illustrative purposes and should not be construed as limiting the scope of the invention which is properly delineated in the claims. All parts are parts by weight.

EXAMPLE 1

A mixture was prepared using 200 parts of an anionically stabilized hydroxyl endblocked polydimethylsiloxane emulsion with a pH of about 2 and 62 percent by weight polymer, 1 part of morpholine, 2 parts of a 50% by weight emulsion of dioctyltindilaurate hereinafter called Tin Emulsion A, and 100 parts of a sodium ion stabilized colloidal silica dispersion present as a 30 percent solids by weight dispersion in water. This colloidal silica dispersion had a pH of about 10. It is hereafter referred to as Colloidal Silica A.

The mixture was allowed to age for 48 hours at room temperature. A sample to about 56 g was placed in a container and the container placed in a freezer at −18° C. for 24 hours. The frozen sample was then allowed to thaw at room temperature for 6 hours. At this point, the sample was a cured, spongy elastomer saturated with water. The cured, spongy elastomer was removed from the container and dried in an oven at 70° C. After drying, the sample was a very tough, cured silicone elastomer sponge with very small cells.

EXAMPLE 2

Additional experiments were run to evaluate the shelf life of the system.

A. A mixture was prepared comprising 200 parts of the anionically polymerized polydimethylsiloxane emulsion of Example 1, 0.3 part of a sodium lauryl sulphate surfactant, 7.6 parts of a 2 percent sodium hydroxide solution, 100 parts of the Colloidal Silica A, 10 parts of finely divided titanium dioxide, 1 part of morpholine, 5 parts of an acrylic thickening agent, and 1 part of Tin Emulsion A. This emulsion had a viscosity of 6 Pa.s at 25° C. when measured on a Brookfield viscometer using a No. 3 spindle at 2 rpm.

B. A mixture was prepared identical to mixture A except that there was used 1.5 parts of a derivative of a xanthan gum as the thickening agent in place of the acrylic thickening agent. This emulsion had a viscosity of 22.3 Pa.s at 25° C., measured as above described.

About 90 days after the mixtures A and B were manufactured, they were tested by producing sponge following the procedure used in Example 1. Both emulsions produced very tough sponges.

That which is claimed is:
1. A method comprising
   (a) freezing a silicone emulsion which provides an elastomeric product upon removal of the water, having a pH in the range of 9 to 11.5 inclusive, comprising water, 100 parts by weight of an anionically stabilized hydroxyl endblocked polydiorganosiloxane having an average molecular weight of greater than 10,000, an organic tin compound, and at least one part by weight colloidal silica, long enough to freeze the water and produce a solid frozen article,
   (b) thawing the solid frozen article yielding a wet elastomeric sponge-like article, and
   (c) drying the wet elastomeric sponge-like article until the water is removed and an elastomeric sponge is obtained.
2. The method according to claim 1 further comprising mechanically mixing air into the emulsion prior to freezing step (a).
3. The method according to claim 1 wherein the emulsion defined in step (a) also contains an organic amine, a thickener, and a filler other than colloidal silica.
4. The method according to claim 1 wherein the colloidal silica is present in an amount from 10 to 50 parts by weight.
5. The method according to claim 1 wherein the drying step (c) comprises exposing the wet sponge-like article to ambient air.
6. The method according to claim 1 wherein the drying step (c) comprises heating the wet sponge-like article.
7. The method according to claim 6 wherein the thawing step comprises heating the solid frozen article.
8. The method according to claim 1 wherein the polydiorganosiloxane is polydimethylsiloxane and the organic tin compound is a dialkyltindicarboxylate present in an amount of from 0.1 to 2 parts by weight for each 100 parts by weight polydiorganosiloxane.
9. The method according to claim 8 wherein the emulsion defined in step (a) also contains an organic amine, a thickener and filler other than colloidal silica.
10. The method according to claim 9 further comprising mechanically mixing air into the emulsion prior to freezing step (a).
11. The method according to claim 10 wherein the drying step (c) comprises exposing the wet sponge-like article to ambient air.
12. The method according to claim 10 wherein the drying step (c) comprises heating the wet sponge-like article.
13. The method according to claim 12 wherein the thawing step comprises heating the solid frozen article.

* * * * *

UNITED STATES PATENT AND TRADEMARK OFFICE
CERTIFICATE OF CORRECTION

PATENT NO. : 4,391,921
DATED : July 5, 1983
INVENTOR(S) : Robert D. Johnson

It is certified that error appears in the above-identified patent and that said Letters Patent is hereby corrected as shown below:

Col. 7, line 8 - "sample to" should read ---sample of---

Signed and Sealed this

Seventeenth Day of January 1984

[SEAL]

Attest:

GERALD J. MOSSINGHOFF

Attesting Officer

Commissioner of Patents and Trademarks